(12) United States Patent
Headrick

(10) Patent No.: US 6,453,631 B1
(45) Date of Patent: Sep. 24, 2002

(54) REINFORCED COEXTRUDED PLASTIC JAMB

(75) Inventor: J. Charles Headrick, Alpharetta, GA (US)

(73) Assignee: Endura Products, Inc., Colfax, NC (US)

( * ) Notice: Subject to any disclaimer, the term of this patent is extended or adjusted under 35 U.S.C. 154(b) by 0 days.

(21) Appl. No.: 09/457,012

(22) Filed: Dec. 8, 1999

(51) Int. Cl.⁷ .............................. E06B 1/26; E06B 1/32
(52) U.S. Cl. ................ 52/210; 52/309.7; 52/309.16; 52/364; 52/734.1; 49/504; 49/DIG. 2
(58) Field of Search .............................. 52/720.1, 736.3, 52/309.9, 309.11, 309.7, 309.16, 309.1, 364, 734.1, 784.15, 784.14, 210; 49/DIG. 2, 504

(56) References Cited

U.S. PATENT DOCUMENTS

| | | | | |
|---|---|---|---|---|
| 2,787,030 A | * | 4/1957 | Williams | |
| 3,313,073 A | * | 4/1967 | Mathews | 52/309.7 |
| 3,922,828 A | * | 12/1975 | Patton | |
| 3,964,231 A | * | 6/1976 | Budich et al. | |
| 3,979,867 A | * | 9/1976 | Sowinski | |
| 4,130,976 A | * | 12/1978 | Kesseler et al. | 52/565 |
| 4,341,831 A | * | 7/1982 | Kleiss | |
| 4,795,666 A | * | 1/1989 | Okada et al. | 428/71 |
| 5,511,355 A | * | 4/1996 | Dingler | 52/729.5 |
| 5,579,618 A | * | 12/1996 | Riegelman | 52/309.16 |
| 5,634,303 A | * | 6/1997 | Ellingson | 52/210 |
| 5,660,907 A | * | 8/1997 | Skalka | 428/67 |
| 5,687,956 A | * | 11/1997 | Vesper | 256/31 |
| 5,791,047 A | * | 8/1998 | Skalka | 29/897.34 |
| 5,819,458 A | * | 10/1998 | Hadden | 52/309.9 X |
| 5,901,510 A | * | 5/1999 | Ellingson | 52/210 |
| 6,125,605 A | | 10/2000 | Young | 52/717.01 |
| 6,148,582 A | * | 11/2000 | Ellingson | 52/656.4 |
| 6,164,035 A | * | 12/2000 | Roberts | 52/563 |

* cited by examiner

Primary Examiner—Robert Canfield
(74) Attorney, Agent, or Firm—Womble Carlyle Sandridge & Rice, PLLC

(57) ABSTRACT

An improved thermoplastic door jamb comprises a blown thermoplastic core encased in a non-blown thermoplastic skin. A pair of aluminum reinforcing members are embedded in the thermoplastic core and are positioned and configured to receive fasteners for securing case molding and brick molding to the inside and outside edges of the jamb respectively. The reinforcing members stabilize the jamb and, in conjunction with the attached moldings, form a rigid stable structure.

13 Claims, 2 Drawing Sheets

REINFORCED COEXTRUDED PLASTIC JAMB

TECHNICAL FIELD

This invention relates generally to doors and windows and more specifically to the jambs of door and window openings that frame the openings and into which doors and windows are mounted.

BACKGROUND OF THE INVENTION

When constructing the doors and windows of a building, a rough opening is usually formed with framing timbers, which in residential housing are generally 2×4 studs. A prefabricated frame is then installed in the rough opening. In the case of a door, this frame generally comprises a threshold and sill assembly defining the bottom of the frame, a pair of spaced vertical jambs defining the sides of the frame, and a head jamb at the top of the frame. The jambs are formed to receive the door panel, which is mounted to one of the vertical jambs by hinges, and to provide a peripheral stop against which the door rests when it is closed. In many cases, weather stripping is provided along the stop to form a seal between the door panel and the stop in order to prevent unwanted drafts through the closed door.

For many years, door jambs, and window jambs for that matter, have been formed of elongated planks or boards of wood that are milled to form the contour of the jamb and to define the raised peripheral stop of the jamb. Since the surfaces of these jambs are generally visible, it has historically been necessary to fabricate door jambs from high grade clear lumber that has no knots, is stable when subjected to moisture, and can be stained and painted with superior results. Although such lumber was plentiful from old growth forests for decades, it has become increasingly rare and correspondingly expensive over the past several years. As a result, old style door frames made of milled clear lumber are quickly becoming cost prohibitive, and can only continue to follow this trend as old growth forests are progressively harvested.

Some attempts have been made to reduce the reliance on expensive lumber in the fabrication of door and window jambs. For example, vinyl clad jambs fabricated of less expensive lower grade lumber covered by a skin of extruded vinyl have become popular. However, these types of jambs still require the time consuming process of milling the wooden jamb members to the desired contour, extruding a vinyl cladding contoured to fit over the wooden jambs, and installing the cladding on the jambs during the manufacturing process. As a result, some vinyl clad jambs can be even more expensive than all wood jambs formed of high grade lumber.

Another attempt to solve the problem has been to fabricate a combination jamb with interior portions made of high grade lumber but with exterior portions made of vinyl or plastic extrusions. These composite jambs have met with some success but still require the use of some high grade lumber for interior portions of the jambs. Further, most of these types of jambs require specialized installation techniques, which carpenters resist. Finally, as with all jambs that include wood, the wooden portions of the jamb are subject to rot and decay over time, particularly in the region of the door sill,.and require replacing over time.

While a door jamb having no wooden components would seem to be a solution to the problem, this has proven an illusive goal for door and window manufacturers. Hollow extruded plastic jambs, while not including any wood, are flimsy, do not take nails and screws like wood, and are generally unacceptable in all but the most inexpensive construction. Solid extruded plastic jambs have not proven practical because the plastic is not as strong as wood and is subject to much greater thermal expansion and contraction than wood, which can cause the jamb to buckle or deform under extreme temperature conditions.

Accordingly, there exists a need for a novel door and window jamb assembly that uses no wood, that is resistant to rot and decay for much longer periods of time than wood, that is installed using traditional carpentry techniques, and that is not subject to degradation due to thermal expansion and contraction. It is to the provision of such a jamb assembly that the present invention is primarily directed.

SUMMARY OF THE INVENTION

Briefly described, the present invention, in one embodiment thereof, comprises an improved door jamb assembly fabricated entirely of coextruded thermoplastic material. The jamb is coextruded with a porous blown thermoplastic core and a solid non blown thermoplastic skin that is adapted to be primed and painted. The jamb is extruded to have the desired profile, and, in the preferred embodiment, has a jamb portion and a raised portion that forms a stop against which a closed door can rest. A groove is extruded along the bottom of the stop for holding a flexible whether strip for sealing against the door.

A pair of rolled or extruded aluminum reinforcing members are coextruded with the jamb and are embedded within the blown core thereof. The reinforcing members are shaped to be surrounded and be gripped by the thermoplastic material of the jamb. The reinforcing members function to minimize the thermal expansion and contraction of the jamb member and to eliminate any tendency of the member to bow or deform when exposed to changes in temperature. In the preferred embodiment, one of the reinforcing members has a leg that is positioned adjacent the inside edge of the jamb for receiving screws or other fasteners that mount a decorative case molding to the jamb. Similarly, the other reinforcing member has a leg that is positioned adjacent the outside edge of the jamb for receiving screws or other fasteners used to attach a brick mold to the jamb. This provides additional reinforcement to the jamb since the reinforcing members are firmly attached to the case molding inside a building and the brick mold on the outside of the building.

Accordingly, an blown all thermoplastic door jamb is now provided that uses no wood, is efficient to manufacture with a minimum of manufacturing steps, that is not subject to rot and decay, and that is strong and thermally stable even under extreme temperature conditions. These and other objects, features, and advantages of the invention will become more apparent upon review of the detailed description set forth below when taken in conjunction with the accompanying drawings, which are briefly described as follows.

DETAILED DESCRIPTION OF THE PREFERRED EMBODIMENT

Figure 1:
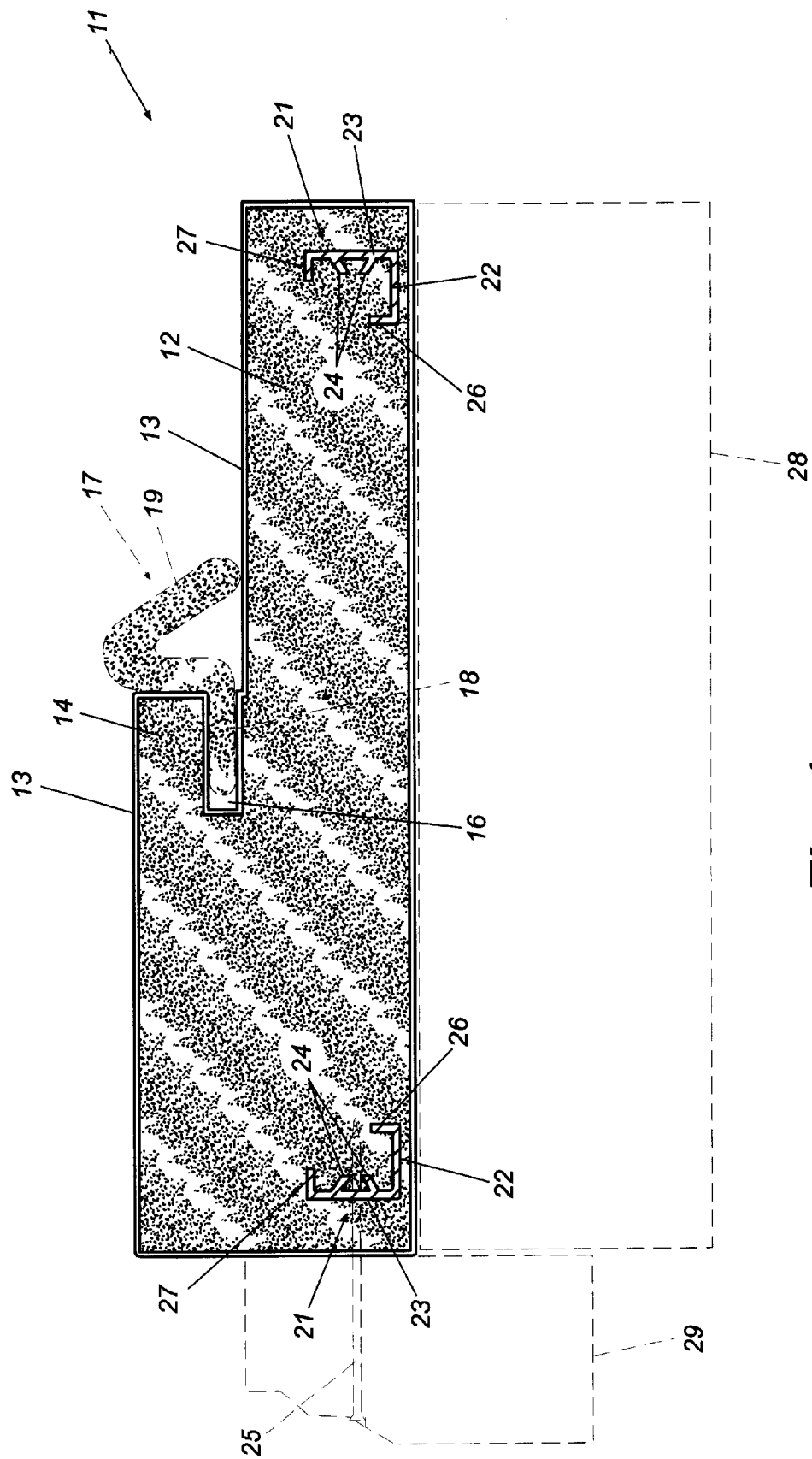
FIG. 1 is a cross sectional view of a door jamb that embodies principles of the invention in a preferred form.

Referring now in more detail to the drawings, in which like numerals refer to like parts throughout the several views, FIG. 1 illustrates in cross section a preferred embodiment of a door jamb that embodies principles of the invention. The jamb 11 is made of coextruded thermoplastic or vinyl material such as, for example, cellular PVC, polystyrene, or ABS plastic, but can be made of any suitable plastic material as desired. The jamb 11 has a porous blown inner core 12 encased in a dense thermoplastic skin 13, which is coextruded simultaneously with the core. The skin 13 preferably is formed of a material that is compatible with standard construction primers and paints so that it can be painted just as wood would be painted. Alternatively, the skin could be pre-primed as an additional step in the extrusion process.

The jamb 11 is contoured to define a raised stop portion 14 for abutting a closed door mounted in a frame incorporating the jamb. A groove or slot 16 is formed at the base of the raised stop 14. A length of weather stripping 17 (shown in phantom lines for clarity in FIG. 1) has a leg 18 that is captured and held in the groove 16 and a flexible seal portion 19 that is captured and compressed between a closed door and the stop to form a tight seal when the door is closed.

Reinforcing members 21 are coextruded with and embedded in the blown core of the jamb 11 as shown. In the preferred embodiment, the reinforcing members 11 are formed of rolled or extruded aluminum or steel and each is generally L-shaped with a first leg 22 and a second leg 23. Lips 26 and 27 may be formed at the end of legs 22 and 23 if desired to provide additional structural integrity to the reinforcing member 21. Projections 24 extend inwardly from the second legs 23 of the reinforcing members and converge toward each other. These projections function both to hold the reinforcing members firmly in place in the material of the jamb and also form a channel for receiving and firmly holding a screw or other fastener driven through the second legs of the reinforcing members. In this regard, the second leg 23 of the right hand reinforcing member in FIG. 1 is located just inside and adjacent the inside edge 36 of the jamb for receiving fasteners that hold the interior case molding to the jamb. Similarly, the second leg 23 of the left hand reinforcing member in FIG. 1 is located just inside and adjacent the outside edge 37 of the jamb for receiving fasteners that hold the outside brick mold 29 to the jamb. Such a fastener 25 is shown extending through the brick mold 29, through the skin 13 of the jamb, and trough the second leg 23 of the reinforcing member where it is firmly held between the converging projections 24. The jamb assembly is mounted in a rough opening in the building partially defined by framing member 28.

The reinforcing members 21 function to reinforce the extruded plastic material of the jamb 11, minimize thermally induced expansion and contraction thereof, and prevent any tendency of the jamb to bow or deform over time or with changing weather conditions. Furthermore, the reinforcing members in conjunction with the case mold and brick mold that are secured to the reinforcing members with fasteners forms an even stronger and more solid structure. Preferably, the reinforcing members are positioned so that their projections are in the proper location for receiving fasteners 25 in an automated fabrication process. However, fabrication on site is also possible with careful measuring.

Figure 2:
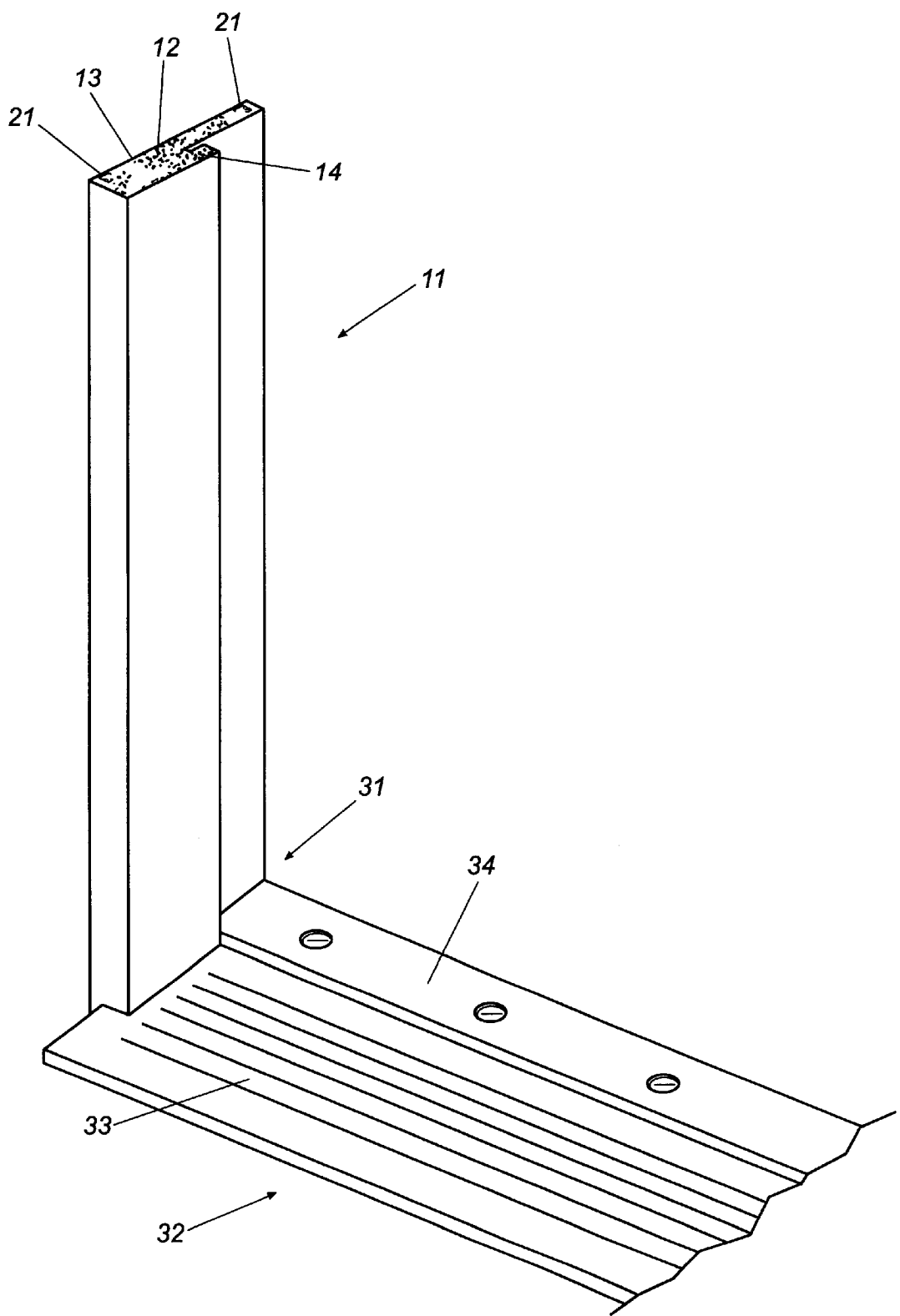
FIG. 2 is a perspective partially sectioned view of a door frame assembly that incorporates the jamb of the present invention.

FIG. 2 illustrates the jamb of this invention incorporated into a door frame assembly. The jamb 11 is fabricated by thermoplastic extrusion processes wherein malleable plastic is progressively extruded through a die to produce the jamb profile. As a result, and as illustrated in FIG. 2, the jamb is elongated in shape with the cross-sectional profile (FIG. 1) of a traditional milled wooden jamb. Preferably the jamb 11 has a blown core 12 and a dense encasing skin 13. Raised stop 14 is formed in and extends along the length of the jamb, and reinforcing members 21 are embedded in the blown core of the jamb. As discussed above, the reinforcing members 21 are co-extruded with and thus progressively become embedded within the thermoplastic jamb during its fabrication. As the natural result of this co-extrusion process, the reinforcing members 21 extend along the length-of the plastic jamb, thus providing the resistance to bowing and deformation of the jamb mentioned above. If the resulting reinforced jamb is cut across its width, as illustrated in the cross-sectional view of FIG. 1, the core, skin, and cross-section of the embedded reinforcing members are visible as shown. The jamb has a bottom portion that is machined to receive and end of a door sill and threshold assembly 32, which can be attached to the jamb using fasteners extending through the reinforcing members as well. The threshold and sill assembly 32 is typical and has a sill 33 and a threshold cap 34 positioned to underlie a closed door mounted in the door frame. The present invention is particularly advantageous at the bottom portion 31 thereof. This is the portion of a door jamb that is typically exposed to moisture and thus subject to rot and decay. However, since the jamb of the present invention has no wooden components, this problem is completely eliminated.

The invention has been described herein in terms of preferred embodiments and methodologies. It will be obvious to those of skill in the art, however, that various additions, deletions, and modifications might well be made to the illustrated embodiments without departing from the spirit and scope of the invention as set forth in the claims.

What is claimed is:

1. An extruded substantially solid thermoplastic door jamb member comprising a jamb portion and a stop portion raised therefrom, said stop portion having a groove extruded along a bottom thereof, said jamb portion and said stop portion including a core, a skin encasing said core and at least one reinforcing member extruded with and embedded in said core extending along said doorjamb member for stabilizing said doorjamb member.

2. The door jamb member of claim 1 and wherein said core is formed of blown thermoplastic material and said skin is formed of dense non-blown thermoplastic material.

3. The door jamb member of claim 2 and wherein said reinforcing member is formed of aluminum.

4. The door jamb member of claim 3 and wherein said reinforcing member has a portion located to receive fasteners for mounting molding to said door jamb member.

5. An extruded substantially solid thermoplastic door jamb member comprising a core, a skin encasing the core, and at least one reinforcing member extruded with and embedded in said core extending along said door jamb member for stabilizing said door jamb member, wherein said reinforcing member has a portion located to receive fasteners for mounting molding to said doorjamb member, and wherein said doorjamb member has an inside edge and an outside edge and wherein said at least one reinforcing member is one of a pair of spaced reinforcing members, one of said pair of spaced reinforcing members being located adjacent said inside edge of said door jamb member and the other one of said pair of spaced reinforcing members being located adjacent said outside edge of said doorjamb member.

6. The door jamb member of claim 5 and further comprsing projections on each of said pair of spaced reinforcing members for receiving and holding fasteners driven through said edges of said door jamb member and through said reinforcing member.

7. A process of fabricating a substantially solid reinforced thermoplastic door jamb member comprising the steps of co-extruding a blown thermoplastic core of the substantially solid reinforced thermoplastic door jamb member with a non-blown dense plastic skin while extruding at least one metal reinforcing member in the core as a part of the co-extrusion process to form the substantially solid reinforced thermoplastic door jamb member having a jamb portion and a stop portion raised therefrom, wherein the stop portion has a groove extruded along a bottom thereof.

8. The door jamb member of claim 1 and wherein said reinforcing member includes a first leg and a second leg.

9. The door jamb member of claim 8, further including a pair of projections extending inwardly from said second leg.

10. A door frame assembly comprising:
   a threshold assembly, and,
   a substantially solid door jamb member having a bottom portion that receives an end of said threshold assembly, said substantially solid door jam member including a core, a skin encasing said core, and at least one reinforcing member extruded with and embedded in said core extending along said door jamb member for stabilizing said doorjamb member.

11. The door frame assembly of claim 10 and wherein said door jamb member further comprises a jamb portion and a stop portion raised therefrom, said stop portion including a groove extending along a bottom thereof.

12. The door frame assembly of claim 11 and wherein said door jamb member further includes a groove extruded along a bottom of said stop portion.

13. The door frame assembly of claim 10, wherein said threshold assembly includes a seal attached to a threshold cap.

\* \* \* \* \*